US011615094B2

(12) United States Patent
Rastogi

(10) Patent No.: US 11,615,094 B2
(45) Date of Patent: *Mar. 28, 2023

(54) SYSTEM AND METHOD FOR JOINING SKEWED DATASETS IN A DISTRIBUTED COMPUTING ENVIRONMENT

(71) Applicant: HCL TECHNOLOGIES LIMITED, New Delhi (IN)

(72) Inventor: Avnish Kumar Rastogi, Noida (IN)

(73) Assignee: HCL TECHNOLOGIES LIMITED, New Delhi (IN)

( * ) Notice: Subject to any disclaimer, the term of this patent is extended or adjusted under 35 U.S.C. 154(b) by 252 days.

This patent is subject to a terminal disclaimer.

(21) Appl. No.: 16/991,939

(22) Filed: Aug. 12, 2020

(65) Prior Publication Data

US 2022/0050845 A1 Feb. 17, 2022

(51) Int. Cl.
*G06F 16/20* (2019.01)
*G06F 16/2453* (2019.01)
*G06F 16/2455* (2019.01)
*G06F 16/27* (2019.01)
*G06F 16/28* (2019.01)
*G06F 16/21* (2019.01)

(52) U.S. Cl.
CPC ...... *G06F 16/24544* (2019.01); *G06F 16/213* (2019.01); *G06F 16/2456* (2019.01); *G06F 16/27* (2019.01); *G06F 16/285* (2019.01)

(58) Field of Classification Search
CPC ...... G06F 16/27; G06F 16/213; G06F 16/285; G06F 16/2456; G06F 16/24544
See application file for complete search history.

(56) References Cited

U.S. PATENT DOCUMENTS

| | | | |
|---|---|---|---|
| 5,987,468 A | 11/1999 | Singh et al. | |
| 6,618,719 B1 | 9/2003 | Andrei | |
| 7,124,413 B1 * | 10/2006 | Klemm | G06F 8/20 717/101 |
| 8,756,194 B1 * | 6/2014 | Merrells | G06F 16/178 707/634 |
| 9,037,589 B2 | 5/2015 | Anderson | |

(Continued)

FOREIGN PATENT DOCUMENTS

KR 102048597 B1 11/2019

*Primary Examiner* — Tarek Chbouki

(57) ABSTRACT

Disclosed is a method and system for joining datasets in a distributed computing environment. The system comprises a memory 206 and a processor 202. The processor 202 identifies a skewed dataset from two or more datasets to be joined. The processor 202 identifies a replication parameter from a configuration file. The processor 202 then assigns a randomly assigned machine number to each chunk of the skewed dataset owned by the nodes/machines involved in the join operation. The processor 202 forms copies of the non-skewed dataset equal to the replication parameter and adds the copy number to each sample of the copy of the non-skewed dataset formed. Further, the processor 202 merges each non-skewed dataset into the final copy of the non-skewed dataset, forming a single non skewed dataset. The processor 202 then repeats these steps for all the non-skewed datasets involved in the join operation resulting in generation of merged copies of all the non-skewed datasets and then performs the joining operation.

12 Claims, 4 Drawing Sheets

(56) References Cited

U.S. PATENT DOCUMENTS

| | | | | |
|---|---|---|---|---|
| 11,086,545 B1* | 8/2021 | Dayal | .................... | G06F 3/067 |
| 2014/0379692 A1* | 12/2014 | Teletia | ................. | G06F 16/278 |
| | | | | 707/714 |
| 2015/0205849 A1* | 7/2015 | Jayapal | .................. | G06F 16/27 |
| | | | | 707/636 |
| 2016/0103880 A1* | 4/2016 | Attaluri | .............. | G06F 16/2255 |
| | | | | 707/714 |
| 2017/0212800 A1* | 7/2017 | Sharma | .............. | G06F 11/1016 |
| 2019/0325043 A1* | 10/2019 | Liao | ................... | G06F 16/1748 |

* cited by examiner

SYSTEM AND METHOD FOR JOINING SKEWED DATASETS IN A DISTRIBUTED COMPUTING ENVIRONMENT

CROSS-REFERENCE TO RELATED APPLICATIONS AND PRIORITY

The present application does not claim priority from any patent application.

TECHNICAL FIELD

The present subject matter described herein, in general, relates to data processing, and more particularly to a system and method for joining skewed datasets in a distributed computing environment.

BACKGROUND

Massively Big Data systems or applications involve processing of multiple datasets to extract relevant attributes from different datasets involved. The attributes may be transformed for creating a resultant dataset. Such operation of processing multiple datasets, extracting attributes and transforming some or all of these attributes extracted from these datasets is termed a join operation in database parlance.

In a join operation, the features are extracted from different datasets against a set of common keys or attributes. These set of attributes are called join keys. In very large distributed datasets, the join operation involves datasets distributed across number of machines. Data samples are distributed across these machines based on the join attributes for each of the data samples using any of the partitioning schemes. One such partitioning may be hash partitioning. Hash partitioning involves hashing values of the join attributes that generates a unique hash number. The modulus operation of the hash with the number of computing nodes provides the unique machine number. This machine number is used to determine ownership of the data samples based on the join keys.

Since the join operations involve very large datasets which are stored in a distributed manner across the machines of the cluster, data samples have to be moved around the cluster of machines so that the data samples with the same set of keys are moved to the same machine as determined by the partitioner and hence are co-located. The movement of data across the cluster of machines is termed as shuffling of data. The distribution of the rows vis-à-vis the join keys/attributes becomes important to determine the efficiency of the join. If the data is uniformly distributed on the join attributes/keys, the number of rows to be shuffled across the machines will be uniform, thus generating a uniform shuffle pressure on the machines involved in the join operation. However, if the rows are heavily skewed towards a set of join attributes/keys i.e., group of attributes used in joining operation, large number of rows need to be transferred, shuffled or copied to one or more than one machine responsible, for joining those specific set of join keys.

Such a process of shuffling causes a significant delay in the join operation. Also, the Join operation may involve only a subset of computing machines forming the cluster, further letting a majority of the machines of the cluster remain idle thereby wasting costly compute resources.

However, there may be a problem where the distribution of the data for one of the datasets (especially the larger datasets amongst the datasets to be joined), on the joining keys (attributes) is heavily skewed. Such a skew causes a very large number of records of the dataset to be shuffled and moved to a set of machines assigned the responsibility of joining the datasets for those skewed join attributes/keys. Since the dataset is heavily skewed, process of extracting the data from the available datasets on the join attributes and enriching the data so extracted becomes inefficient.

SUMMARY

Before the present system and method for joining datasets in a distributed computing environment are described, it is to be understood that this application is not limited to the particular systems, and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application.

This summary is provided to introduce aspects related to a system and method for joining datasets. This summary is not intended to identify essential features of the claimed system and method for joining skewed datasets in a distributed computing environment. The subject matter is not intended for use in determining or limiting the scope of the claimed subject matter.

In one implementation, a system for joining datasets in a distributed computing environment is disclosed. In one aspect, the system comprises a memory, and a processor coupled to the memory. Further, the processor may be capable of executing instructions in the memory to perform one or more steps described now. The processor is configured for identifying, a skewed dataset from one or more datasets at each node. The one or more dataset comprises at least one of a non-skewed datasets and the skewed dataset. Each of the skewed dataset and the non-skewed dataset is associated with one or more original attributes specified for joining of the datasets. Further the processor is configured to identify a replication factor to be read from one of a configuration files or an external computer system. The replication factor is determined by size of the non-skewed datasets involved in the join operation. Further the processor is configured to assign, a randomly assigned machine number between a preset range, set according to the replication factor to each of the node performing a join operation of the one or more dataset. Further the processor is configured to add the randomly assigned machine number to the chunks of the skewed dataset present at each of the node performing the join operation of the one or more dataset. The random number is added as a new attribute. Further the processor is configured for forming, copies of each of the non-skewed dataset equal to the replication factor. Further the processor is configured to add a copy number to each copy of the non-skewed dataset formed according to the replication parameter at each of the node performing the join operation. Further the processor is configured to merge the non-skewed dataset, in order to form a single non-skewed dataset. Each of the forming copies, adding the copy number as a new attribute, populating the new attribute as the "copy number" and merging the copies into a single copy is repeated for each of the non-skewed datasets involved in the join operation. Further, the processor is configured to join each of the single non-skewed dataset with the skewed dataset with each of the original attribute and the new attribute for creating a final joined dataset.

In another implementation, a method for joining datasets is disclosed. In one aspect, the processor performs identifying of the skewed dataset from one or more datasets at each node. The one or more dataset comprises at least one of the non-skewed datasets and the skewed dataset. Each of the skewed dataset and the non-skewed dataset is associated with one or more original attributes specified for joining of the datasets. Further the processor performs identification of the replication factor to be read from one of the configuration files or the external computer system. The replication factor is determined by size of the non-skewed datasets and the number of non-skewed datasets involved in the join operation. Further the processor assigns a randomly assigned machine number between a preset range, set according to the replication factor to each of the node performing a join operation of the one or more datasets. Further the randomly assigned machine number is added to all the chunks of the skewed dataset present at the nodes performing the join operation of the one or more dataset. This randomly assigned machine number is added as a new attribute. Further copies of each of the non-skewed dataset equal to the replication factor are formed by the processor. Further a copy number is added to each copy of the non-skewed dataset formed according to the replication parameter at each of the node performing the join operation. Further each copy of the non-skewed dataset is merged with other one or more copies of the non-skewed dataset, in order to form a single non-skewed dataset. Each of the forming copies, adding the copy number as a new attribute, populating the new attribute as the "copy number" and merging the copies into a single copy is repeated, for each of the non-skewed datasets involved in the join operation. Further each of the single non-skewed dataset with the skewed dataset is joined with each of the original attribute and the new attribute for creating a final joined dataset.

BRIEF DESCRIPTION OF THE DRAWINGS

The foregoing detailed description of embodiments is better understood when read in conjunction with the appended drawings. For the purpose of illustration of the present subject matter, an example of construction of the present subject matter is provided as figures; however, the invention is not limited to the specific method and system disclosed in the document and the figures.

The present subject matter is described in detail with reference to the accompanying figures. In the figures, the left-most digit(s) of a reference number identifies the figure in which the reference number first appears. The same numbers are used throughout the drawings to refer various features of the present subject matter.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods for joining datasets in a distributed computing environment, similar or equivalent to those described herein can be used in the practice or testing of embodiments of the present disclosure, the exemplary, joining datasets are now described. The disclosed embodiments for joining datasets in a distributed computing environment are merely examples of the disclosure, which may be embodied in various forms.

Various modifications to the embodiment will be readily apparent to those skilled in the art and the generic principles herein may be applied to other embodiments for joining skewed datasets in a distributed computing environment. However, one of ordinary skill in the art will readily recognize that the present disclosure for joining skewed datasets in a distributed computing environment is not intended to be limited to the embodiments described, but is to be accorded the widest scope consistent with the principles and features described herein.

Generally, there may be a problem where the distribution of the data for one of the datasets especially the larger dataset amongst the datasets to be joined, on the basis of joining keys attributes is heavily skewed. This skew causes all the records for this dataset to be shuffled and moved to one or more than one set of machines as joining the dataset samples belonging to those keys is the responsibility of those nodes. Since the dataset is heavily skewed, the process of enriching the data by join operation becomes inefficient, takes very long time and at times takes forever, causing the resources of the data warehouse to be unavailable for use by other workloads for that duration.

The present description proposes a system configured to solve the above discussed problems and handles data skew efficiently. The present subject matter overcomes a problem of a data skew in large data sets by providing the system and method for joining datasets.

Figure 1:
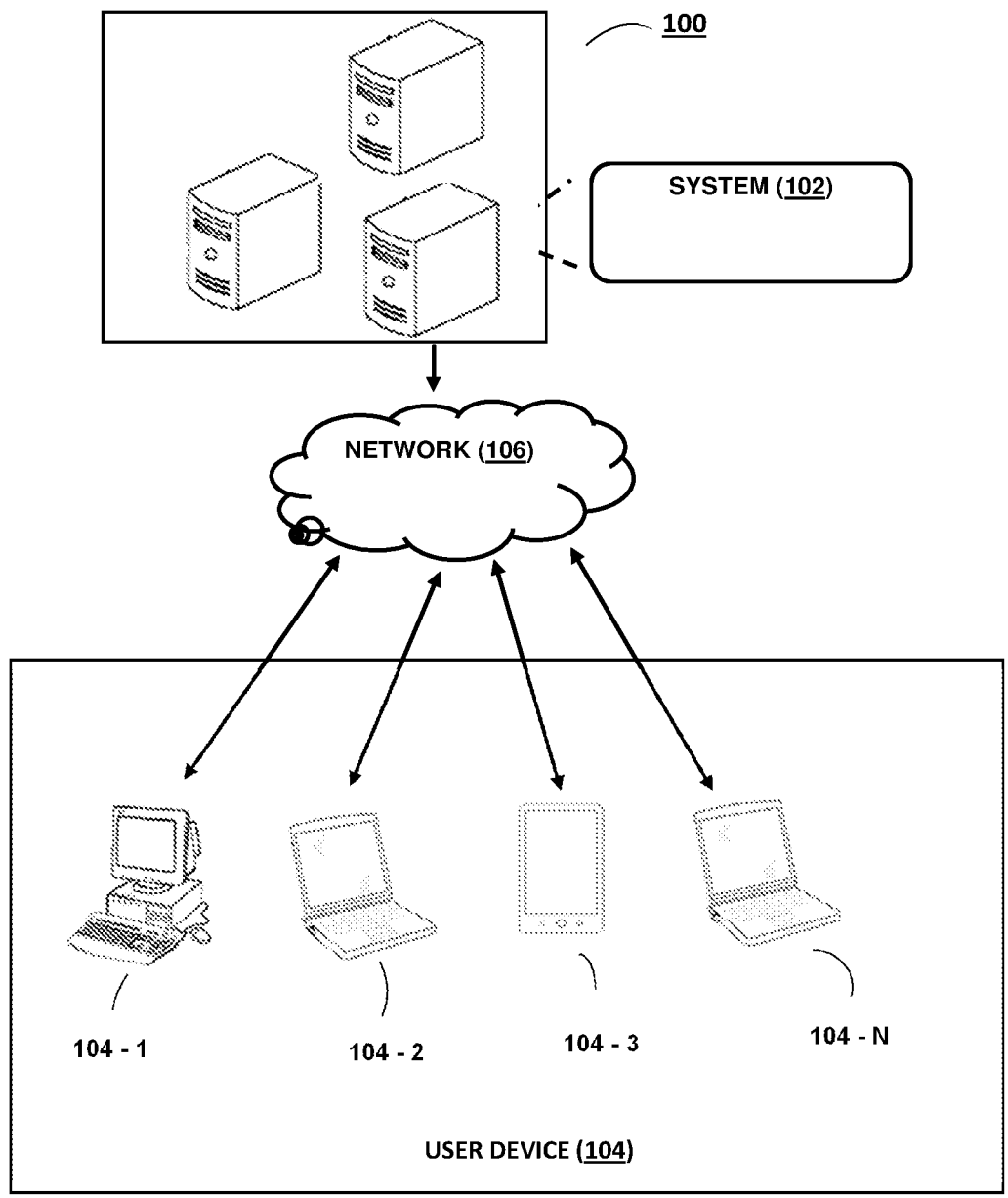
FIG. 1 illustrates a network implementation 100 of a system 102 for processing skewed datasets, in accordance with an embodiment of the present subject matter.

Referring now to FIG. 1, a network implementation 100 of a system 102 for joining datasets, in accordance with an embodiment of the present subject matter may be described. In one example, the system 102 may be connected with mobile devices 104-1 through 104-N (collectively referred as 104) through a communication network 106.

It should be understood that the system 102 correspond to computing devices. It may be understood that the system 102 may also be implemented in a variety of computing systems, such as a cluster of computing machines forming a computing cluster, or a cloud-based computing environment and the like. It may be understood that the mobile devices 104 may correspond to a variety of a variety of portable computing devices, such as a laptop computer, a desktop computer, a notebook, a smart phone, a tablet, a phablet, and the like.

In one implementation, the communication network 106 may be a wireless network, a wired network, or a combination thereof. The communication network 106 can be implemented as one of the different types of networks, such as intranet, Local Area Network (LAN), Wireless Personal Area Network (WPAN), Wireless Local Area Network (WLAN), wide area network (WAN), the internet, and the like. The communication network 106 may either be a dedicated network or a shared network. The shared network represents an association of the different types of networks that use a variety of protocols, for example, MQ Telemetry Transport (MQTT), Extensible Messaging and Presence Protocol (XMPP), Hypertext Transfer Protocol (HTTP), Transmission Control Protocol/Internet Protocol (TCP/IP), Wireless Application Protocol (WAP), and the like, to communicate with one another. Further, the communication network 106 may include a variety of network devices, including routers, bridges, servers, computing devices, storage devices, and the like.

Figure 2:
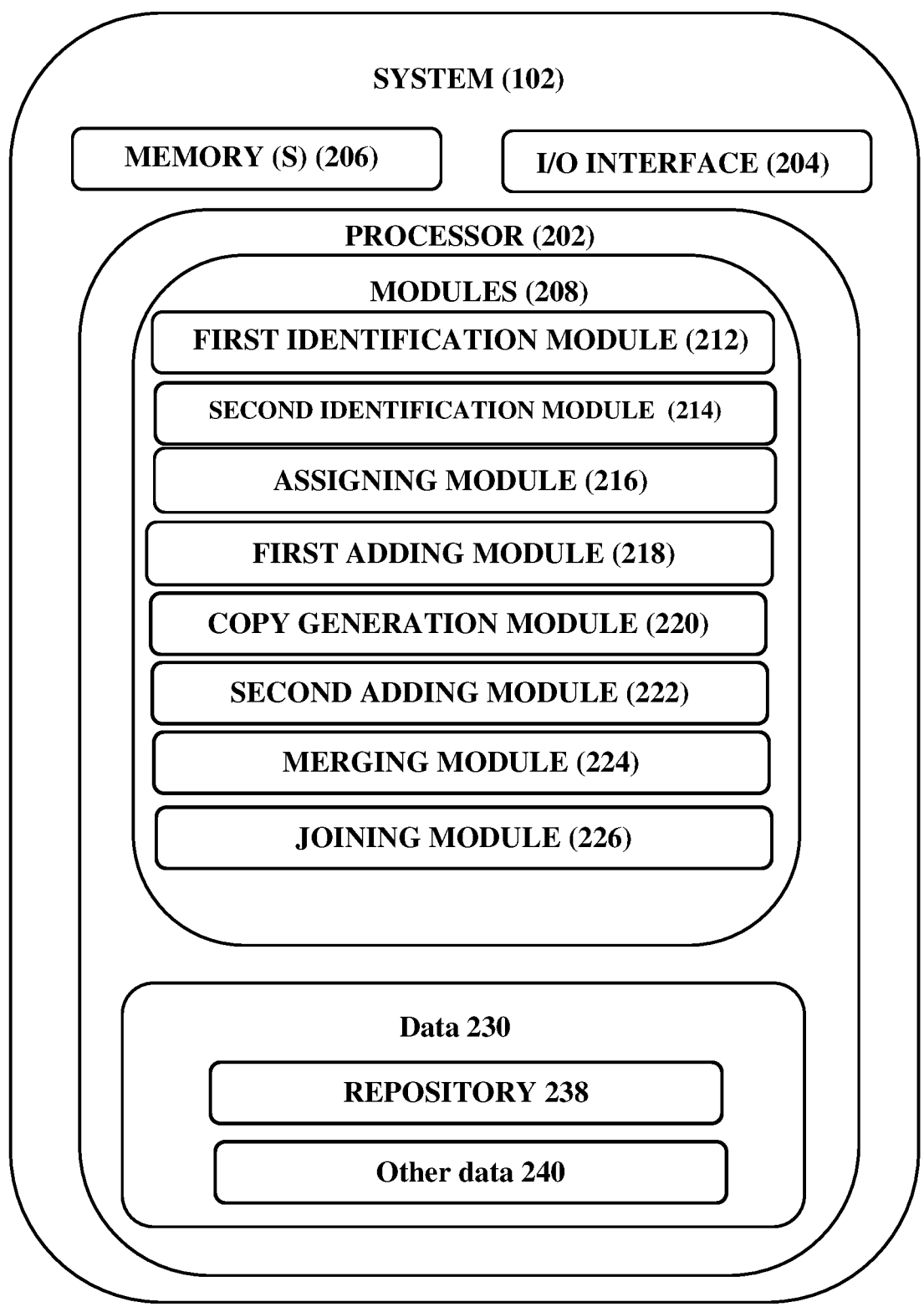
FIG. 2 illustrates a block diagram of the system 102, in accordance with an embodiment of the present subject matter.

Referring now to FIG. 2, a block diagram 200 of the system 102 is illustrated in accordance with an embodiment of the present subject matter. In one such embodiment, the present computer based system may consist of more than one such system 102 forming a cluster of computing nodes, where each machine of the computer system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 may be configured to fetch and execute computer-readable instructions stored in the memory 206.

The I/O interface 204 may include a variety of software and hardware interfaces, for example, a web interface, a graphical user interface, a command line interface, and the like. The I/O interface 204 may allow a user to interact with the system 102. Further, the I/O interface 204 may enable the system 102 to communicate with the mobile devices 104, and other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206, amongst other things, serves as a repository for storing data processed, received, and generated by one or more of modules 208. The memory 206 may include any computer-readable medium or computer program product known in the art including, for example, a volatile memory, such as Static Random Access Memory (SRAM) and Dynamic Random Access Memory (DRAM), and/or non-volatile memory, such as Read Only Memory (ROM), Erasable Programmable ROM (EPROM), Electrically Erasable and Programmable ROM (EEPROM), flash memories, hard disks, optical disks, and magnetic tapes.

The memory 206 may include data generated as a result of the execution of one or more of the modules 208. The memory 206 is connected to a plurality of modules 208. The system 102 comprises and first identification module 212, a second identification module 214, an assigning module 216, a first adding module 218, a copy generation module 220, a second adding module 222, a merging module 224 and a joining module 226.

The data 230 may include a repository 238 for storing data processed, computed, received, and generated by one or more of the modules 208. Furthermore, the data 210 may include other data 240 for storing data generated as a result of the execution of modules than the ones mentioned above.

In one implementation, for joining the datasets in the distributed computing environment, the processor 202 may identify a skewed dataset from one or more datasets at each node (machine). The one or more dataset comprises at least one of a non-skewed datasets and the skewed dataset. Further, each of the skewed dataset and the non-skewed dataset is associated with original attributes used for joining of the datasets. The skewed dataset is a larger dataset in a set of two or more datasets to be joined. The original attributes comprise of the attributes on which the join operation is performed. In one such embodiment, a dataset comprising of an inventory for an ecommerce company may need to be joined with the shipping information dataset where the joining attribute may be the purchased product SKU.

Further the processor 202 may identify, a replication parameter from a configuration file. The replication parameter depends on the number of nodes involved in the join operation and also the size of the dataset for which the "replication" copies are being created. In case, the number of nodes involved in the join operation are N, the replication parameter may be set to N. To determine the replication factor, the size of the non-skewed dataset is also taken into consideration. Depending on the size of the non-skewed dataset, the replication parameter may be reduced from "N" to a number which makes the size of the dataset after the copy and merge operation reasonable enough to be processed by the distributed system.

After identifying the replication factor, the processor 202 may assign, a randomly assigned machine number between a pre-set range, at each of the node performing the join operation of the one or more datasets. For example, in a join operation if four nodes are involved, each of these nodes may be assigned a random identifier between 0 and 3. The randomly assigned machine number is assigned according to the replication factor. The pre-set range comprises a range between number 0 and the replication factor Further the processor 202 is configured to add the randomly assigned machine number as a new attribute to each of the samples of the skewed dataset chunk owned by the node/machine The processor 202 is configured to form, copies of each of the non-skewed dataset equal to the replication factor.

Further the processor 202 may be configured to add, a copy number to each copy of the non-skewed dataset formed. The copy number is added as the new attribute to each of the samples of the copy of the non-skewed dataset. The attribute is populated with the copy number of the non-skewed dataset. The copy number for a copy of a non-skewed dataset remains the same for each of the samples of the copy for that dataset. The process of adding a copy number is repeated for each of the copies of all the non-skewed datasets involved in the join operation.

The processor 202 is further configured to merge each copy of the non-skewed dataset with other one or more copies of the non-skewed dataset in order to form a single copy for that non-skewed dataset. The processor 202 repeats this merge operation for each of the non-skewed datasets.

The processor 202 rearranges and reshuffles the skewed dataset and the final non-skewed datasets to "n" computing nodes, or a multiple thereof, in case the replication factor is reduced from the number of partitions of the skewed dataset/non-skewed dataset to a lesser number say "n", This operation in the distributed parlance is called repartition. So, the skewed/non-skewed dataset shall be repartitioned into "n" nodes.

The processor is further configured to join each of the single non-skewed datasets with the skewed dataset with each of the original attributes and the new attribute i.e., copy number (non-skewed datasets) and machine number (skewed dataset) for creating a final joint dataset.

Figure 3:
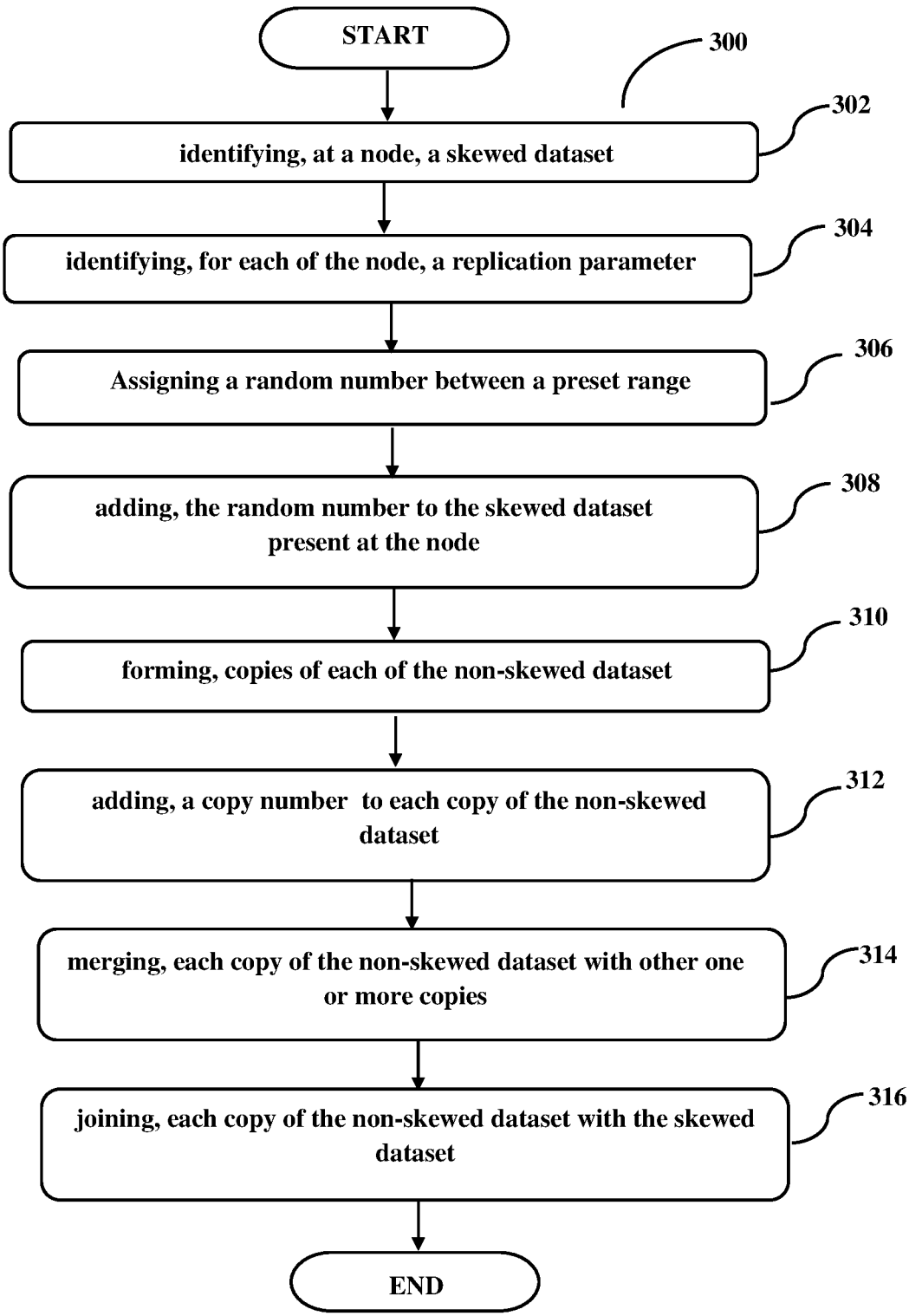
FIG. 3 illustrates a method 300 for processing joining datasets, in accordance with an embodiment of the present subject matter.

Referring now to FIG. 3, a method 300 for joining dataset is described, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types.

The order in which the method 300 for joining dataset is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described system 102.

At block 302, the processor 202 is configured to identify a skewed dataset from one or more datasets by the first identification module 212. The one or more dataset comprises at least one of the non-skewed datasets and the skewed dataset. Each of the skewed dataset and the non-skewed dataset is associated with the attributes used for joining of the datasets. The skewed dataset is the larger dataset in a set of two or more datasets to be joined.

At block 304, the processor 202 is configured to identify the replication factor from a configuration file by the second identification module 214.

At block 306, after the identification of the replication factor, the processor 202 is configured to assign a randomly assigned machine number between the preset range set according to the replication factor at each of the node performing a join operation of the one or more datasets by the assigning module 216. The preset range comprises the range between number 0 and the replication factor.

At block 308, the processor 202 is configured to add a new attribute the randomly assigned machine number to the skewed dataset present at each of the node performing the join operation of the one or more dataset. The addition is performed by the adding module 218. The randomly assigned machine number is added as a new attribute. The original attribute comprises of the attributes specified by the user or the external system for the join operation.

At block 310, the processor 202 forms copies of each of the non-skewed dataset equal to the replication factor by the copy generation module 220.

At block 312, the processor 202 is configured to add, an attribute, a copy number, to each copy of the non-skewed dataset formed according to the replication factor at each of the node performing the joining operation by the second adding module 222. The copy number is added as a new attribute to each of the copy of the non-skewed dataset. The attribute is populated with the copy number in each row in the copy of the non-skewed dataset. This process/step is repeated for each of the non-skewed datasets.

At block 314, the processor 202 is configured to merge each copy of the non-skewed dataset with other one or more copies of the non-skewed dataset by the merging module 224. The copies of the non-skewed dataset are merged into the non-skewed dataset to form a single non-skewed dataset. This merge operation is performed for each of the non-skewed datasets involved in the join operation. In case, the non-skewed datasets are associated with each of the original attribute and a new attribute, the new attribute comprises the copy number.

At block 316, the processor 202 is configured to perform the joining operation of each of the non-skewed datasets with the skewed dataset with each of the original attribute and the new attributes added to the skewed and non-skewed datasets for creating the final joint dataset by the joining module 226.

Figure 4:
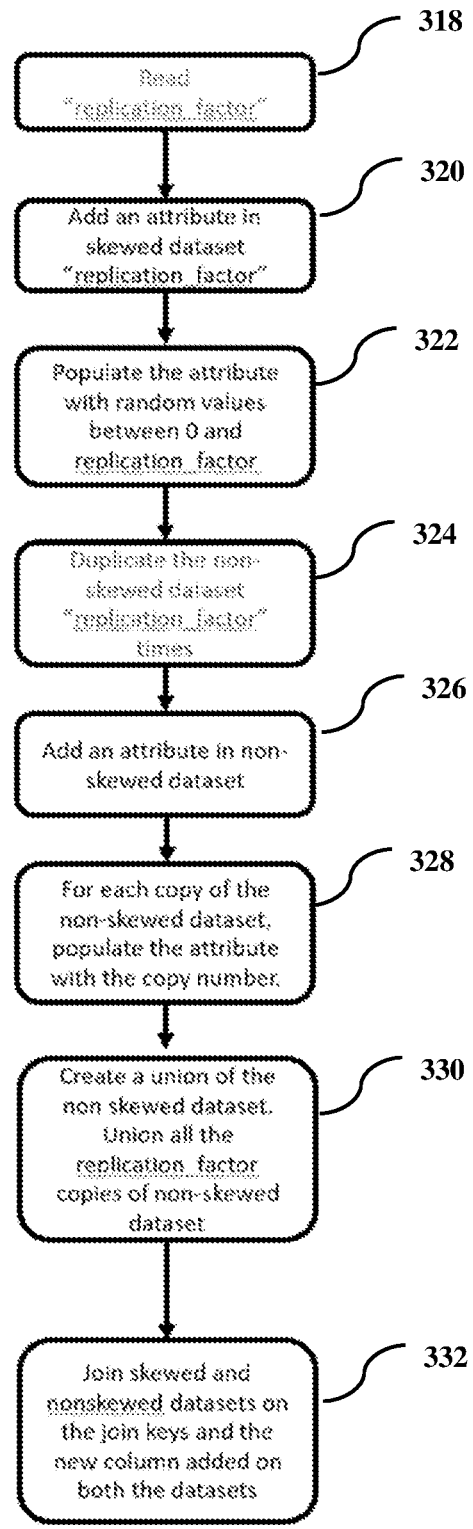
FIG. 4 illustrates an exemplary flowchart for the method 300 for joining datasets, in accordance with an embodiment of the present subject matter.

Referring now to FIG. 4, a flowchart of the method 300 for joining datasets is described, in accordance with an embodiment of the present subject matter.

In an example implementation, at step 318, the processor 202 is configured to identify a skewed dataset from one or more datasets by the first identification module 212. In step 320, after reading the of the replication factor, the processor 202 is configured to assign the randomly assigned machine number between the preset range set according to the replication factor at each of the node performing the join operation of the one or more datasets by the assigning module 216. The preset range comprises the range between number 0 and the replication factor.

At step 322 the processor 202 is configured to augment the skewed dataset with a new attribute "machine number", where each node will populate the chunk of the skewed dataset it owns with the machine number assigned to it in step 318. The addition is performed by the adding module 218. Here the randomly assigned machine number is added as a new attribute.

At step 324 and 326, the processor 202 is configured to form copies of each of the non-skewed dataset equal to the replication factor. First adding module 218 adds a new attribute "copy number" to each of the copies for the non-skewed dataset. Formation of copies of each dataset and adding the "copy number" to non-skewed dataset are repeated for all the non-skewed datasets involved in the join operation.

At step 328 for a non-skewed dataset, for each of the samples in the copy, the value of the attribute "copy number" is populated with the copy number of the copy it belongs to. The populating of the copy number as a new attribute is repeated for all the non-skewed datasets involved in the join operation.

At step 330, the processor 202 is configured to merge each copy of the non-skewed dataset with other one or more copies of the non-skewed dataset by the merging module 224. The copies of the non-skewed dataset are merged into the non-skewed dataset to form a single non-skewed dataset. In case, the single non-skewed dataset is associated with each of the original attribute and a new attribute, the new attribute comprises the copy number. The processor repeats the merging of copies of non-skewed dataset with non-skewed dataset for all the non-skewed datasets involved in the join operation.

At step 332, the processor 202 is configured to perform the joining operation of each of the non-skewed datasets with the skewed dataset with each of the original attribute and the new attributes for creating a final joint dataset by the joining module 226.

I claim:

1. A method of joining datasets in a distributed computing environment, the method comprising:
identifying, at each node, a skewed dataset from one or more datasets, wherein the one or more dataset comprises at least one of a non-skewed dataset and the skewed dataset, wherein each of the skewed dataset and the non-skewed dataset is associated with one or more original attributes specified for joining of the datasets;

identifying, a replication factor to be read from one of a configuration files or an external computer system; wherein the replication factor is determined by size of the non-skewed datasets involved in the join operation;

assigning, to each of the node performing a join operation of the one or more datasets, a randomly assigned machine number between a preset range, set according to the replication factor;

adding, at each of the node performing the join operation of the one or more dataset, the randomly assigned machine number to all the chunks of the skewed dataset present at different nodes, wherein the random number is added as a new attribute;

forming, copies of each of the non-skewed dataset equal to the replication factor;

adding, at each of the nodes performing the join operation, a copy number to each copy of the non-skewed dataset formed according to the replication parameter;

merging, each copy of the non-skewed dataset with other one or more copies of the non-skewed dataset, in order to form a single non-skewed dataset;

repeating each of the forming copies, adding the copy number as a new attribute, populating the new attribute as the "copy number" and merging the copies into a single copy, for each of the non-skewed datasets involved in the join operation; and joining, each of the single non-skewed dataset with the skewed dataset with each of the original attribute and the new attribute for creating a final joined dataset.

2. The method as claimed in claim 1, wherein the skewed dataset is a larger dataset in a set of two datasets to be joined.

3. The method as claimed in claim 1, wherein the original attribute comprises join key attributes.

4. The method as claimed in claim 1, wherein the preset range comprises a range between number 0 and the replication factor.

5. The method as claimed in claim 1, wherein the copy number is added as a new attribute to each of the copy of the non-skewed dataset, wherein the attribute is populated with the copy number in each row in the copy of the non-skewed dataset.

6. The method as claimed in claim 1, wherein non-skewed datasets if associated with each of the original attribute and a new attribute, wherein the new attribute comprises the copy number.

7. A system joining datasets in a distributed computing environment, the system comprising:

a memory; and a processor coupled to the memory, wherein the processor is configured to execute a set of instructions stored in the memory, wherein the processor is configured to:

identify, at each node, a skewed dataset from one or more datasets, wherein the one or more dataset comprises at least one of a non-skewed dataset and the skewed dataset, wherein each of the skewed dataset and the non-skewed datasets are associated with one or more original attributes provided for joining of the datasets;

identify, a replication factor to be read from one of a configuration file or an external computer system; wherein the replication factor is determined by size of the non-skewed datasets involved in the join operation;

assign, at each of the node performing a join operation of the one or more datasets, a randomly assigned machine number between a preset range, set according to the replication parameter;

add, at each of the node performing the join operation of the one or more dataset, the randomly assigned machine number to all the chunks of the skewed dataset present at all the nodes, wherein the randomly assigned machine number is added as a new attribute to all the samples of the data in that chunk;

form, copies of each of the non-skewed dataset equal to the replication parameter;

add, at each of the node performing the join operation, a copy number to each copy of the non-skewed dataset formed according to the replication factor;

merge, each copy of the non-skewed dataset with other one or more copies of the non-skewed dataset, in order to form a single non-skewed dataset;

repeat, each of the forming copies, adding the copy number as a new attribute, populating the new attribute as the "copy number" and merging the copies into a single copy, for each of the non-skewed datasets involved in the join operation; and join, each of the single non-skewed dataset with the skewed dataset with each of the original attribute and the new attribute for creating a final joint dataset.

8. The system as claimed in claim 7, wherein the skewed dataset is a larger dataset in a set of two datasets to be joined.

9. The system as claimed in claim 7, wherein the original attribute comprises a join key attribute.

10. The system as claimed in claim 7, wherein the preset range comprises a range between number 0 and the replication factor.

11. The system as claimed in claim 7, wherein the copy number is added as a new attribute to each of the copy of the non-skewed dataset, wherein the attribute is populated with the copy number in each row in the copy of the non-skewed dataset.

12. The system as claimed in claim 7, wherein single non-skewed dataset if associated with each of the original attribute and a new attribute, wherein the new attribute comprises the copy number.

* * * * *